United States Patent
Allen et al.

(10) Patent No.: US 8,685,545 B2
(45) Date of Patent: Apr. 1, 2014

(54) THERMAL BARRIER COATING SYSTEM WITH POROUS TUNGSTEN BRONZE STRUCTURED UNDERLAYER

(75) Inventors: David B. Allen, Oviedo, FL (US); Anand A. Kulkarni, Oviedo, FL (US)

(73) Assignee: Siemens Aktiengesellschaft, München (DE)

( * ) Notice: Subject to any disclaimer, the term of this patent is extended or adjusted under 35 U.S.C. 154(b) by 170 days.

(21) Appl. No.: 13/371,519

(22) Filed: Feb. 13, 2012

(65) Prior Publication Data

US 2013/0209786 A1 Aug. 15, 2013

(51) Int. Cl.
| | |
|---|---|
| *B32B 9/00* | (2006.01) |
| *B32B 15/04* | (2006.01) |
| *B32B 19/00* | (2006.01) |
| *C23C 28/04* | (2006.01) |
| *C04B 35/48* | (2006.01) |
| *C04B 35/50* | (2006.01) |
| *C04B 35/468* | (2006.01) |
| *F01D 11/00* | (2006.01) |
| *F01D 11/12* | (2006.01) |

(52) U.S. Cl.
CPC .............. *C23C 28/04* (2013.01); *C04B 35/48* (2013.01); *C04B 35/50* (2013.01); *C04B 35/468* (2013.01); *C23C 28/042* (2013.01); *C23C 28/044* (2013.01); *F01D 11/00* (2013.01); *F01D 11/122* (2013.01); *C01P 2002/30* (2013.01); *C01P 2002/50* (2013.01); *C01P 2004/82* (2013.01); *C01P 2006/14* (2013.01)
USPC ............ 428/701; 428/472; 428/699; 428/702

(58) Field of Classification Search
CPC ...... C04B 35/48; C04B 35/468; C04B 35/50; C01P 2006/14; C01P 2002/30; C01P 2002/50; C01P 2004/82; F02D 11/00; F02D 11/122; C23C 28/04; C23C 28/042; C23C 28/044
USPC .................................. 428/472, 699, 701, 702
See application file for complete search history.

(56) References Cited

U.S. PATENT DOCUMENTS

| | | | |
|---|---|---|---|
| 3,938,064 | A | 2/1976 | O'Bryan, Jr. et al. |
| 4,353,047 | A | 10/1982 | Noguchi et al. |

(Continued)

FOREIGN PATENT DOCUMENTS

| | | |
|---|---|---|
| EP | 2431495 A1 | 9/2010 |
| EP | 2423347 A1 | 2/2012 |
| WO | 2007137876 A1 | 12/2007 |

OTHER PUBLICATIONS

Kuang et al., "A powder X-Ray diffraction refinement of the BaNd2Ti3O10 structure", Materials Research Bulletin 37, 2002, pp. 1755-1761.

*Primary Examiner* — Jonathan Langman

(57) ABSTRACT

A system of layers in a protective coating (20) for a substrate (22), including at least an outer thermal barrier layer (32) and a tungsten bronze structure ceramic underlayer (30) that reduces spalling of the outer layer. The range of materials for the underlayer includes ceramics of the form $Ba_{6-3m}Re_{8+2m}Ti_{18}O_{54}$, where $0<m<1.5$, and Re is any rare earth element or mixture thereof. These underlayer materials reduce spalling of the thermal barrier layer, and thus extend the life of the coating system. In some embodiments, materials for the outer thermal barrier layer may include Yttria-stabilized Zirconia (YSZ) or ceramics with lower thermal conductivity than YSZ. A segmented YSZ layer (26) is provided in some embodiments for additional thermal expansion compliance.

13 Claims, 3 Drawing Sheets

(56) References Cited

U.S. PATENT DOCUMENTS

| | | |
|---|---|---|
| 5,037,784 A | 8/1991 | Raveau et al. |
| 5,512,524 A | 4/1996 | Negas et al. |
| 5,552,355 A | 9/1996 | Cava et al. |
| 5,562,998 A | 10/1996 | Strangman |
| 6,309,749 B1 | 10/2001 | Chatterjee et al. |
| 6,680,126 B1 | 1/2004 | Sambasvian et al. |
| 6,733,907 B2 | 5/2004 | Morrison et al. |
| 6,835,465 B2 | 12/2004 | Allen et al. |
| 6,890,668 B2 | 5/2005 | Bruce et al. |
| 6,933,060 B2 | 8/2005 | Subramanian et al. |
| 6,946,208 B2 | 9/2005 | Subramanian et al. |
| 6,982,126 B2 | 1/2006 | Darolia et al. |
| 7,090,723 B2 | 8/2006 | Sambasvian et al. |
| 7,172,984 B2 | 2/2007 | Zolnier et al. |
| 7,255,940 B2 | 8/2007 | Spitsberg et al. |
| 2002/0132127 A1 | 9/2002 | Naito |
| 2007/0151481 A1 | 7/2007 | Akiyama et al. |
| 2008/0145629 A1* | 6/2008 | Anoshkina et al. ........... 428/213 |
| 2009/0017260 A1* | 1/2009 | Kulkarni et al. .............. 428/161 |
| 2009/0258247 A1 | 10/2009 | Kulkarni et al. |
| 2010/0047063 A1 | 2/2010 | Kulkarni et al. |

* cited by examiner

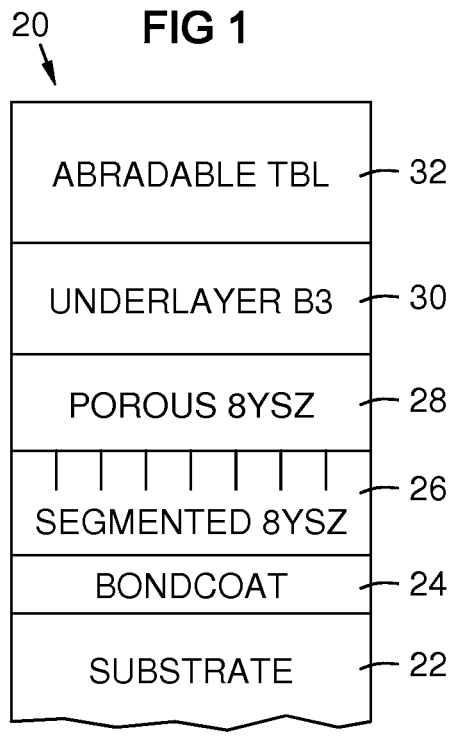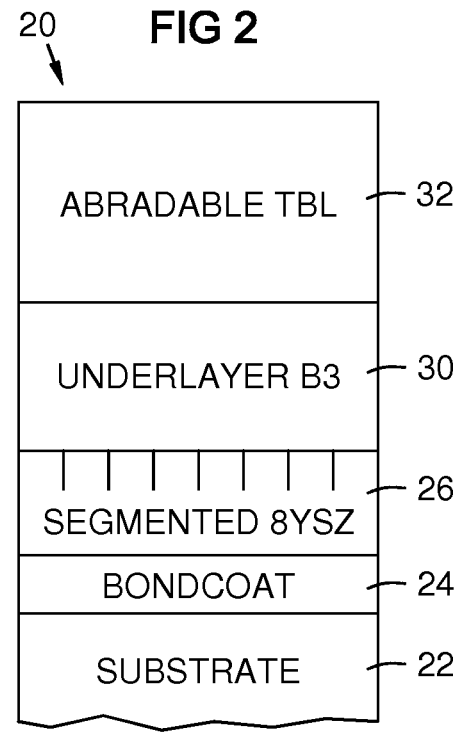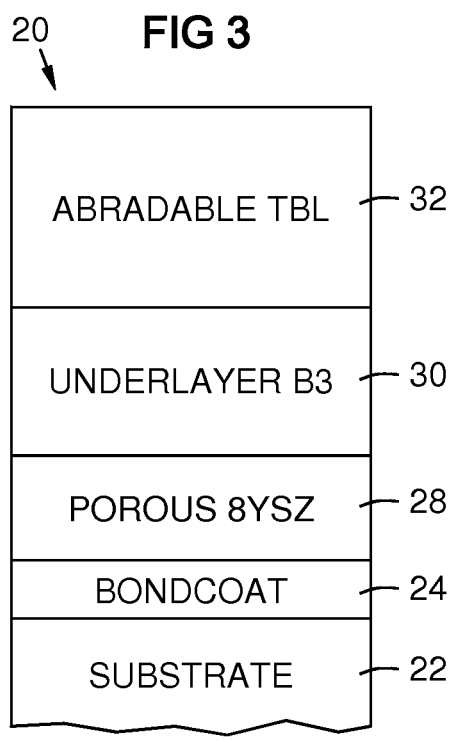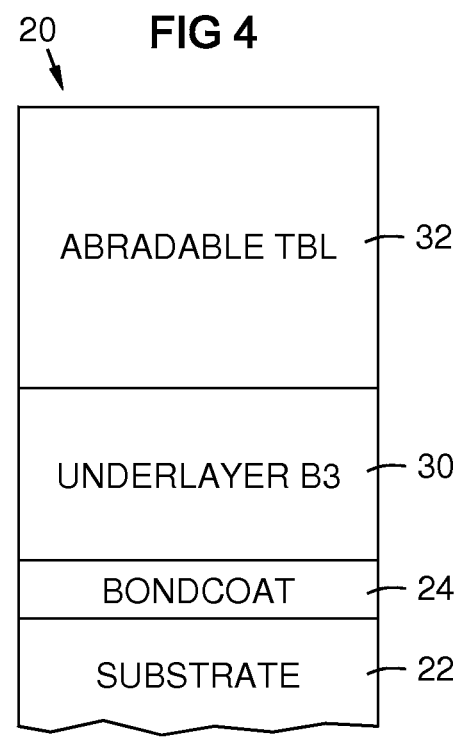

FIG 5

| Embodiment | Substrate | Bondcoat | Layer 2 | Layer 3 | Layer 4 | Layer 5 |
|---|---|---|---|---|---|---|
| 1 - FIG 1 | Ni or Co superalloy | MCrAlY * | >95% dense segmented 8YSZ | 8-15% porous 8YSZ | 25-35% porous B3 | 25-35% porous 8YSZ |
| 2 - FIG 2 | Ni or Co superalloy | MCrAlY * | >95% dense segmented 8YSZ | 25-35% porous B3 | 25-35% porous 8YSZ | |
| 3 - FIG 3 | Ni or Co superalloy | MCrAlY * | 8-15% porous 8YSZ | 25-35% porous B3 | 25-35% porous 8YSZ | |
| 4 - FIG 4 | Ni or Co superalloy | MCrAlY * | 25-35% porous B3 | 8-15% porous 8YSZ | | 25-35% por. GZO YBZO, or GHO |
| 5 - FIG 1 | Ni or Co superalloy | MCrAlY * | >95% dense segmented 8YSZ | 25-35% porous 8YSZ | 25-35% porous B3 | |
| 6 - FIG 2 | Ni or Co superalloy | MCrAlY * | >95% dense segmented 8YSZ | 25-35% porous B3 | 25-35% por. GZO YBZO, or GHO | |
| 7 - FIG 3 | Ni or Co superalloy | MCrAlY * | 8-15% porous 8YSZ | 25-35% porous B3 | 25-35% por. GZO YBZO, or GHO | |
| 8 - FIG 4 | Ni or Co superalloy | MCrAlY * | 25-35% porous B3 | 25-35% por. GZO YBZO, or GHO | | |
| 9 - FIG 1 | Ni or Co superalloy | MCrAlY * | >95% dense segmented 8YSZ | 25-35% porous 8YSZ | 25-35% porous B3 | 25-35% por. GZO YBZO, or GHO |

* The "M" in MCrAlY means Co, Ni or CoNi. The bondcoat may contain other rare earth element additions for increased oxidation resistance 36 = Porous 8YSZ
38 = Porous YBZO
40 = Porous BNT B3

THERMAL BARRIER COATING SYSTEM WITH POROUS TUNGSTEN BRONZE STRUCTURED UNDERLAYER

FIELD OF THE INVENTION

The invention relates to thermal barrier coatings, and particularly to abradable thermal barrier coatings with spallation reduction for gas turbine components.

BACKGROUND OF THE INVENTION

The turbine sections of gas turbine engines contain stationary components that serve as an outer ring and sealing surface to reduce interstage gas leakage past the turbine blade tips. In industrial gas turbines (IGT's) these stationary components are termed "ring segments" and in aero engines they are called "blade outer air seals" or BOAS. Both aero and IGT components in the hot working gas path are coated with an oxidation resistant metallic layer called a bondcoat, and one or more layers of thermally insulating ceramic coatings. In addition, the outermost ceramic layer(s) are purposely sprayed with a low density (porous) to enable them to perform as clearance control coatings known as abradable coatings. When the metal turbine blades rub against the porous abradable coating, the blades will cut a swath through the coating without damaging the blade, thus allowing tighter clearance between the blade tips and the ring segments to minimize hot gas leakage between turbine stages. This has a beneficial effect on both power output and fuel efficiency, so abradable coatings are very important to engine designers.

Abradable coatings are typically sprayed much thicker than other types of thermal barrier coatings because their thickness is required to allow the blade tips to cut into the coating the desired amount. As the coating thickness increases, the thermal strains in the coating during startup and shutdown of the engine also increase. This can result in spalling of the abradable coating, and loss of both clearance control (engine power and efficiency) and thermal protection (metal ring segment service life).

BRIEF DESCRIPTION OF THE DRAWINGS

The invention is explained in the following description in view of the drawings that show:

FIG. 1 shows a coating system layering that illustrates exemplary embodiments 1, 5, and 9 of FIG. 5.

FIG. 2 shows a coating system layering that illustrates exemplary embodiments 2 and 6 of FIG. 5.

FIG. 3 shows a coating system layering that illustrates exemplary embodiments 3 and 7 of FIG. 5.

FIG. 4 shows a coating system layering that illustrates exemplary embodiments 4 and 8 of FIG. 5.

FIG. 5 shows a list of exemplary embodiments of the invention.

DETAILED DESCRIPTION OF THE INVENTION

Figure 6:
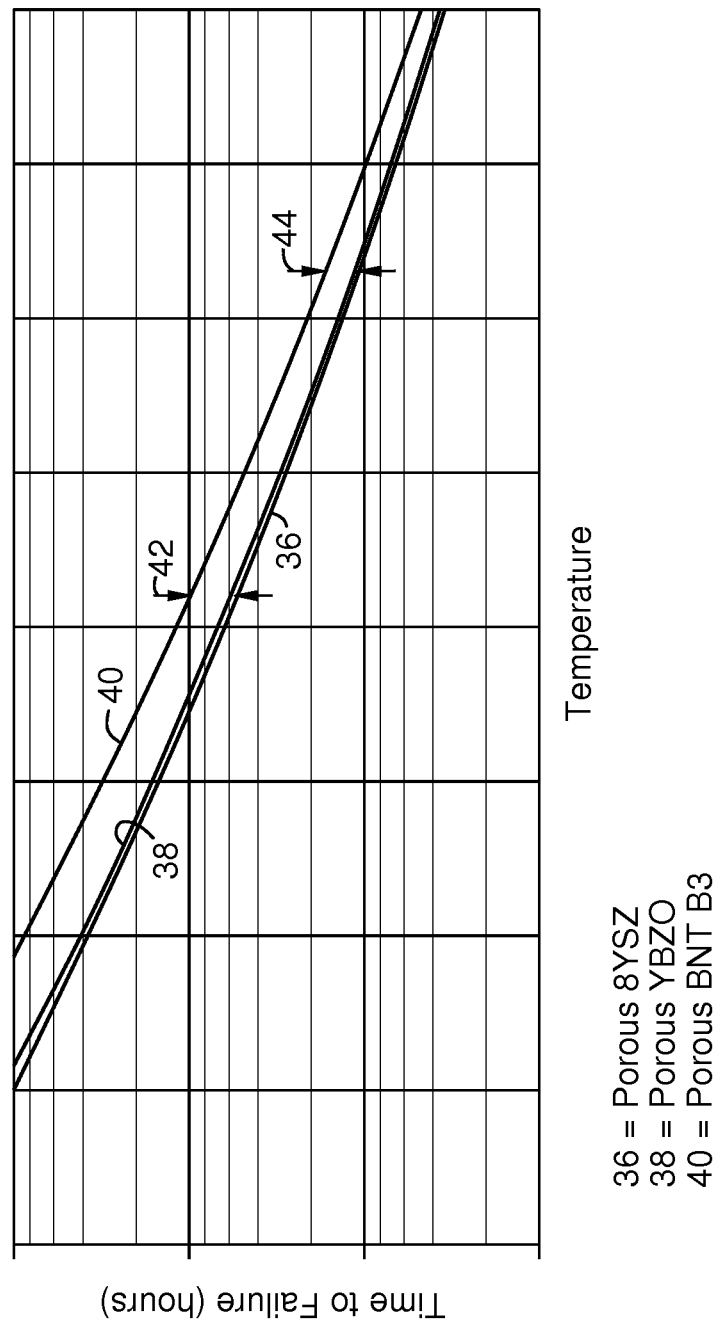
FIG. 6 shows comparative test results between prior coatings and the present coating system.

The present invention provides a system of layers for a hot gas path turbine component, including an underlayer for an abradable thermal barrier layer that provides improved coating performance when compared to prior art abradable coatings. For clarification of the elements herein, the term "Thermal Barrier Coating" (TBC) means the whole coating including all layers; while "Thermal Barrier Layer" (TBL) means the outermost layer of the coating; and "Thermal Barrier Material" (TBM) means the material of the TBL.

In Patent Application Publication US 2009/0258247 A1, the present inventors described a range of tungsten bronze structured ceramic materials that are beneficial for an outermost abradable layer because these materials are abradable and have phase stability and sinter resistance up to 1400° C., thus resisting densification in gas turbine operating temperatures. The present inventors have now discovered that these materials can advantageously be used as an underlayer beneath a traditional or advanced abradable TBL, the traditional one being 7-9 mol. % Yttria-stabilized Zirconia (YSZ herein), and the advanced ones being pyrochlore systems such as 25-65 mol % Gadolinium Hafnate (GHO herein), 25-65 mol % Gadolinium Zirconate (GZO herein), and/or 25-65 mol % Ytterbium Zirconate (YBZO herein). The range of materials for the underlayer includes ceramics of the form $Ba_{6-3m}Re_{8+2m}Ti_{18}O_{54}$, where $0<m<1.5$, and Re is any rare earth element or mixture thereof. These materials include compounds such as $Ba\ Nd_2\ Ti_4\ O_{12}$ (BNT herein) with or without rare earth dopants that reduce its thermal conductivity, and $Ba\ (Nd_{1.2}Sm_{0.4}Gd_{0.4})\ Ti_4\ O_{12}$. Generically these materials are termed "B3" herein, and are generally considered to be tungsten bronze structured ceramics. These underlayer materials not only reduce spalling of the TBL by providing mechanical compliance, but they also exhibit their own inherent abradability such that they function as an abradable material when penetrated by a blade tip or when exposed due to abrasion of the overlying TBL. Thus, a total thickness of the TBL and underlayer provides increased abradability when compared to prior art coatings. The various layers of the invention may be applied by thermal spray or other known techniques. Porosity in a layer may be created by fugitive inclusions and/or hollow ceramic spheres or other means. A B3 layer may be applied beneath an outermost porous abradable TBL for use as a clearance control coating on gas turbine ring segments. The underlayer properties of B3 provide superior spallation life to an outer abradable TBL that can work independently of the abradability of the B3 itself as a way to increase the life of the coating system of layers as a whole. The B3 layer may have a porosity of at least 5% or 5-35% or 25-35% in various embodiments to increase thermal insulation and thermal expansion compatibility with adjacent porous layer(s).

FIGS. 1-5 show and list exemplary embodiments of the invention. A segmented layer 26 is provided in some embodiments for additional thermal expansion compliance between the substrate 22 and upper layers 28-32. "Segmented layer" herein means a layer divided into a plurality of segments by grooves or cracks that are at least 50% as deep as the segmented layer, thereby defining segments with a maximum dimension no greater than 5 times the depth of the segmented layer.

FIG. 1 shows layering in a thermal barrier coating system 20 that illustrates exemplary embodiments 1, 5, and 9 of FIG. 5, including a substrate 22; a bondcoat 24 such as MCrAlY, where "M" means Co, Ni, or CoNi; a segmented YSZ layer 26; a porous YSZ layer 28; a porous B3 layer 30; and finally, a porous thermal barrier layer 32, such as YSZ, YBZO, GZO, or GHO.

FIG. 2 shows layering in a thermal barrier coating 20 that illustrates exemplary embodiments 2 and 6 of FIG. 5, including a substrate 22; a bondcoat 24 such as MCrAlY; a segmented YSZ layer 26; a porous B3 layer 30; and finally, a porous thermal barrier layer 32, such as YSZ, YBZO, GZO, or GHO.

FIG. 3 shows layering in a thermal barrier coating 20 that illustrates exemplary embodiments 3 and 7 of FIG. 5, including a substrate 22; a bondcoat 24 such as MCrAlY; a porous YSZ layer 28; a porous B3 layer 30; and finally, a porous thermal barrier layer 32, such as YSZ, YBZO, GZO, or GHO.

FIG. 4 shows layering in a thermal barrier coating that illustrates exemplary embodiments 4 and 8 of FIG. 5, including a substrate 22; a bondcoat 24 such as MCrAlY; a porous B3 layer 30; and finally, a porous thermal barrier layer 32, such as YSZ, YBZO, GZO, or GHO.

A particular embodiment of the invention may be selected or designed for specific benefits in a particular design and environment. For instance, the 8YSZ TBL has lower abradability compared to the YBZO, GZO or GHO TBLs. But it is much less expensive, and so may be preferred for older, mature frame industrial gas turbines. The YBZO TBL is quite expensive and also has less erosion resistance compared to the 8YSZ TBL, so it may be the preferred choice for applications in which abradability is the most important criterion, and where cost and erosion resistance are less important.

Selection of the top abradable coating (TBL) is also highly dependent on the engine condition at that location. For example, an advanced pyrochlore abradable TBL with underlayer B3 and segmented layer as shown in FIG. 1 might be critical for row 1 and 2 ring segments where high temperature stability and sintering resistance is desired in the lop abradable TBL, and where the segmented underlayer 26 allows for increased crack propagation resistance at the TBC—bond coat interface.

Another advantage of a higher layer count, as in FIG. 1 is that it maximizes interlayer compatibility. This may be preferable in turbine areas or designs with smaller clearance variation and/or where a larger total coating thickness is desirable. The segmented layer 26 may have greater than 95% density in the ceramic material itself (not including the segmenting grooves or cracks), resulting in very high fracture resistance that avoids cracks at the-TBC-bond coat interface, thus increasing TBC spallation resistance.

A lower layer count as in FIG. 4 allows a thicker abradable TBL 32 and/or a thicker underlayer B3 within the total coating thickness. This may be preferable in turbine designs with larger clearance variation and/or where the total coating thickness must be limited.

FIG. 6 compares the spallation life of three coatings tested during a series of thermal cycling tests over a range of gas turbine operating temperatures. The spallation data was for 3 systems:

Trace 36=bondcoat+segmented 8YSZ+porous 8YSZ TBL
Trace 38=bondcoat+porous 8YSZ+porous YBZO TBL
Trace 40=bondcoat+porous 8YSZ TBL+porous B3 TBL All three coatings were sprayed onto Hast-X buttons using an HVOF CoNiCrAlY bondcoat. A porous BNT B3 coating produced the upper trace 40. It exhibits 100% longer spallation life at a first temperature 42, and 50% longer spallation life at a second temperature 44 compared to 8YSZ (trace 36) and YBZO (trace 38). This increase in spallation life can double the life of the coating in some conditions, thus increasing the service interval and reducing cost. Alternately, it enables increasing the operating temperature in the engine by 30-50° C. for increased engine efficiency. Hence the B3 layer as described herein is beneficial as an underlayer to other abradable coating systems.

The B3 underlayer 30 provides spallation resistance to the abradable TBL 32 due to strong adhesion between the B3 material and the TBL, and due to physical compliance in the B3 material during thermal cycling and mechanical stresses in the coating system 20. This compliance reduces stress that would otherwise exist in the TBL 30 and the TBC 20 due to differential thermal expansion between the substrate and the TBC, and due to abrasion and particle impacts on the TBL. The B3 materials herein resist densification from sintering caused by high operational temperatures and thermal cycling. Thus, the B3 underlayer 30 retains its compliant, stress-reducing, and abradability properties over a greater temperature range than 8YSZ, making it a better choice for an underlayer compared to the conventional 8YSZ underlayer. And, as mentioned previously in this application, the tungsten bronze materials have a higher innate abradability compared to an 8YSZ TBL of similar density, which has the advantage of reduced blade wear should the blades fully penetrate the outer YBZO or GZO or GHO TBL layer (reference Patent Application Publication US 2009/0258247 A1). This, combined with the superior spallation resistance of the tungsten bronze (B3) material, establishes it as the favored choice of underlayer for an abradable TBL system.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A thermal barrier coating comprising:
   an underlayer of a tungsten bronze structured ceramic material; and
   a layer of a thermal barrier material on the underlayer;
   wherein the underlayer comprises at least one of the group of: 1) an underlayer material $Ba_{6-3m}RE_{8+2m}Ti_{18}O_{54}$ where $0<m<1.5$, and RE represents any rare earth element or mixture thereof; and 2) an underlayer material $Ba\ Nd_2\ Ti_4\ O_{12}$ with rare earth dopants that reduce its thermal conductivity;
   wherein the thermal barrier material comprises 7-9 mol. % yttria-stabilized zirconia (YSZ) or a ceramic with a lower thermal conductivity than the YSZ; and
   wherein the underlayer is 25% to 35% porous, and the layer of thermal barrier material is 25% to 35% porous.

2. The thermal barrier coating of claim 1, further comprising a bond coat on a substrate, and a segmented layer on the bond coat, wherein the underlayer is disposed on the segmented layer.

3. The thermal barrier coating of claim 1, wherein the ceramic with lower thermal conductivity comprises 25-65 mol % Ytterbium Zirconate, 25-65 mol % Gadolinium Zirconate, or 25-65 mol % Gadolinium Hafnate.

4. The thermal barrier coating of claim 1, further comprising a bond coat on a substrate, and a segmented layer of greater than 95% dense yttria-stabilized zirconia on the bond coat, wherein the underlayer is disposed on the segmented layer.

5. The thermal barrier coating of claim 1, comprising the following sequence of layers;
   a bond coat on a substrate;
   a segmented layer comprising YSZ on the bond coat;
   a third layer of porous YSZ on the segmented layer; and
   the underlayer on the third layer.

6. The thermal barrier coating of claim 5, wherein the ceramic with lower thermal conductivity comprises 25-65 mol % Ytterbium Zirconate, 25-65 mol % Gadolinium Zirconate, or 25-65 mol % Gadolinium Hafnate.

7. The thermal barrier coating of claim 1, comprising the following sequence of layers:
   a bond coat on a substrate;
   a segmented layer comprising YSZ on the bond coat; and
   the underlayer on the segmented layer.

8. The thermal barrier coating of claim 7, wherein the ceramic with lower thermal conductivity comprises 25-65 mol % Ytterbium Zirconate, 25-65 mol % Gadolinium Zirconate, or 25-65 mol % Gadolinium Hafnate.

9. The thermal barrier coating of claim 1, comprising the following sequence of layers:
   a bond coat on a substrate;
   a third layer of 8-15% porous YSZ on the bond coat; and
   the underlayer being on the third layer.

10. The thermal barrier coating of claim 9, wherein the ceramic with lower thermal conductivity comprises 25-65 mol % Ytterbium Zirconate, 25-65 mol % Gadolinium Zirconate, or 25-65 mol % Gadolinium Hafnate.

11. The thermal barrier coating of claim 1, comprising the following sequence of layers;
   a bond coat on a substrate; and
   the underlayer being on the bond coat.

12. The thermal barrier coating of claim 11, wherein the ceramic with lower thermal conductivity comprises 25-65 mol % Ytterbium Zirconate, 25-65 mol % Gadolinium Zirconate, or 25-65 mol % Gadolinium Hafnate.

13. A thermal barrier coating comprising:
   an underlayer comprising Ba $(Nd_{1.2}Sm_{0.4}Gd_{0.4})$ Ti$_4$ O$_{12}$; and
   a layer of a thermal barrier material on the underlayer.

* * * * *